United States Patent [19]
Reyland

[11] 3,794,152
[45] Feb. 26, 1974

[54] AUTOMATIC MOLD INDEXING DEVICE

[75] Inventor: James Nicholas Reyland, St. Louis, Mo.

[73] Assignee: International Telephone and Telegraph Corporation, New York, N.Y.

[22] Filed: Apr. 24, 1972

[21] Appl. No.: 246,835

[52] U.S. Cl. .................. 198/20, 214/89, 104/88, 198/135
[51] Int. Cl. ............................................. B66b 17/00
[58] Field of Search .... 214/89; 198/31 AB, 218, 20, 198/135; 164/269; 425/468; 104/172 S, 88, 91, 92

[56] References Cited
UNITED STATES PATENTS

| | | | |
|---|---|---|---|
| 2,869,739 | 1/1959 | Davis | 214/16.4 R |
| 3,141,560 | 7/1964 | Rink | 214/89 |
| 3,443,526 | 5/1969 | Gee | 104/172 S X |
| 1,789,860 | 1/1931 | Bennington | 164/269 X |
| 2,605,004 | 7/1952 | Grueneberg | 214/16.4 R |
| 2,682,958 | 7/1954 | Francis | 214/16.1 B |

Primary Examiner—Albert J. Makay
Attorney, Agent, or Firm—C. Cornell Remsen, Jr.; James B. Raden; Marvin M. Chaban

[57] ABSTRACT

A transfer mechanism is disclosed for use in a foundry operation by receiving the output of an automatic molding machine and for transferring the sand mold produced from the machine onto a pallet line for pouring of the molds. The transfer mechanism may be designed for a single pallet line with the machine at one end of the line or alternatively may be designed for two longitudinally spaced lines with the machine at the center of the two lines. The carriage mechanism is a multiple mold-bearing shuttle, translatable past the machine output station and is advanced by a rope drive Geneva mechanism to convey the carriage mechanism in a step-by-step path along the edge of the pallet lines. On each such step, a mold is moved from the machine to the transfer mechanism and at the end of a traverse of the mechanism, the molds are removed from the carriage mechanism onto the pallet line.

5 Claims, 4 Drawing Figures

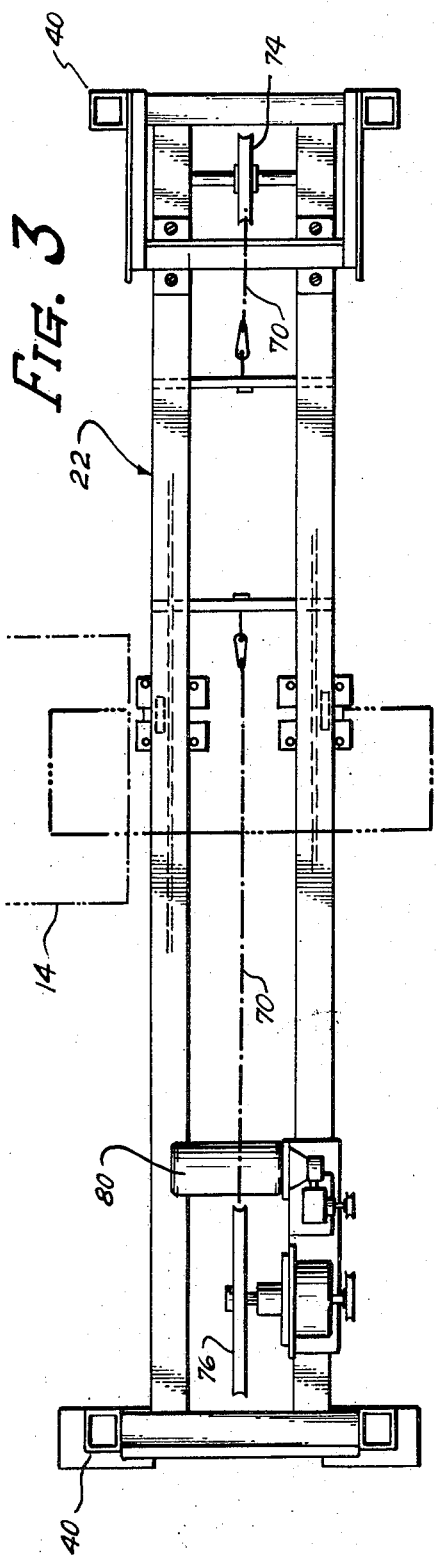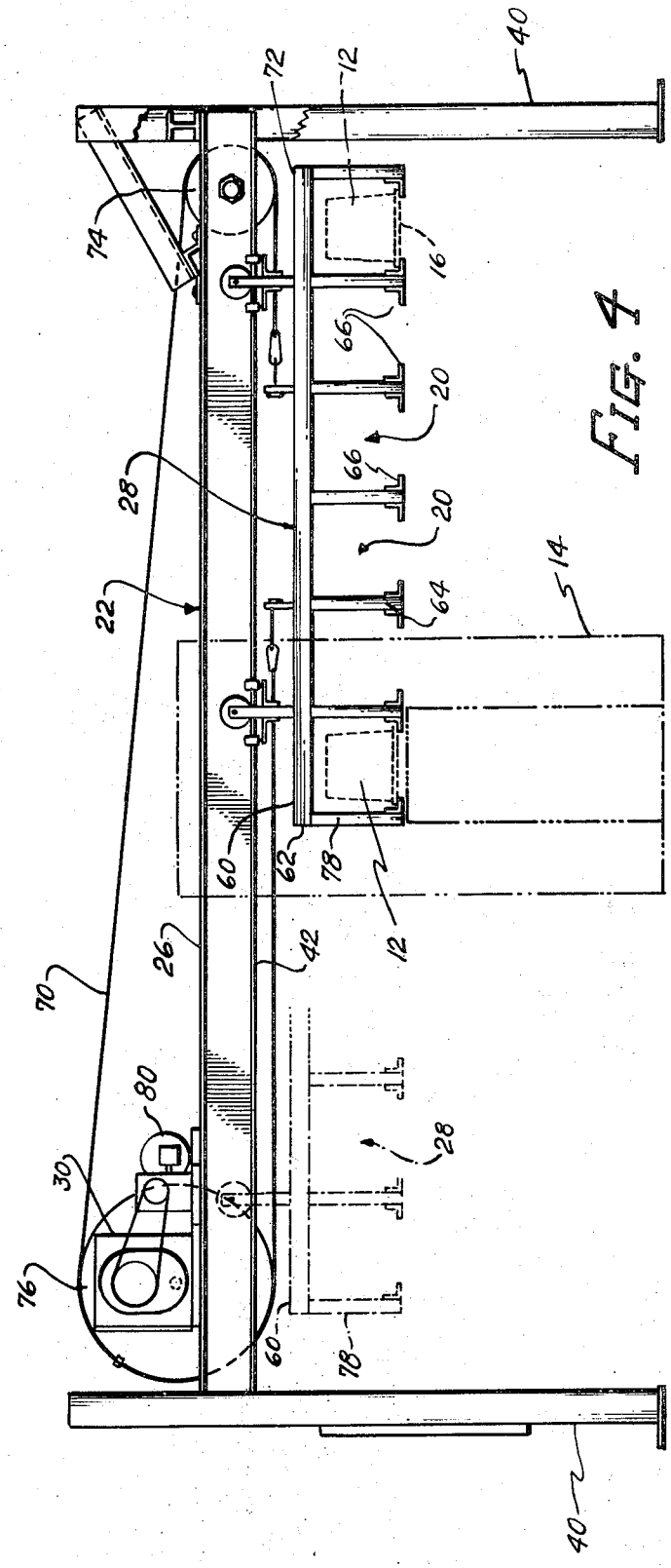

AUTOMATIC MOLD INDEXING DEVICE

BACKGROUND OF THE INVENTION

Within a foundry, automatic molding machines have become quite important and as the machines have become important, so have mechanisms for conveying completed molds from the machine to a pallet line for use. The usual approach is to push the completed mold out of the machine and onto a transverse step-by-step conveyor controlled by limit switches and the like for transfer to the pallet line.

The mold output of the machine is frequently flaskless and when flaskless, the mold rests on a perforated bottom board or plate. The completed mold may weigh in the neighborhood of 200 pounds and comprises a compressed sand block. The mold must be conveyed smoothly and gently without jarring or shaking since there is no confining structure for the mold sand, the machine squeeze action being the holding force for the mold. Acceleration and deceleration of the mold during conveying or transfer must be controlled to prevent jarring of the molds and displacement between the mold halves and possible consequent mold fracturing or shifting.

Further, the area of a foundry is a sand-filled environment, there being sand blown from the mold following each machine cycle and excess sand on the machine and transfer mechanism. Sand, besides being abrasive in nature, tends to fall on any stationary or open surface and will, in a short period, fill cavities in control members and can cause malfunctioning of limit switches and any other intricate control members in the general vicinity of the machine and transfer mechanism.

SUMMARY OF THE INVENTION

The present invention comprises a transfer mechanism for receiving the output of an automatic molding machine and conveying the sand mold output to a pallet line for use.

Automatic molding machines of the usual known design may form flaskless molds of molding sand, each mold resting individually on a plate or bottom board. The bottom board rests on a platform at the machine output station with the mold of squeezed, cohered sand resting thereon. The molds must be conveyed away from the machine for setting onto pallets of a pallet line. An overhead crane, hand ladles or the like are used to pour molten metal into the mold cavity through a suitable opening in the mold, usually while on the pallet line.

The molds, themselves, are essentially rectangular blocks of molding material such as sand, the block having a mold cavity therein. Molds from such machines may weigh in the vicinity of 200 pounds before casting and are essentially compressed sand structures, of joined halves with a mold cavity therein.

The transport mechanism comprises a reciprocable, multicompartment or multi-bay carriage which is indexed step-by-step past the molding machine output station to place a compartment or bay in communication with the station on each indexing step. With a compartment opposite the station, a mold may be raised and advanced from the station into the compartment. The carriage is driven by a rope drive, the rope passing over the top of the carriage with each compartment including side supports and horizontal partial flanges extending below the compartment opening.

A mold resting in the machine output station is elevated to align its mold board slightly above the level of the compartment flanges and is advanced to convey the mold into the compartment. The mold elevating and advance device is then depressed and retracted through the open bottom of the compartment. The carriage is then indexed to place another empty compartment in communication with the station.

A single transfer multiple-bay mechanism may supply either a single pallet line or two (end-to-end) pallet lines, the placement of the machines relative to the line or lines, the capacity of the carriage, and its travel pattern in the form of rapid empty return or step-by-step mold receiving return being the only changes necessary.

For a two pallet line system, the machine is located at the juncture of the end-to-end lines and a carriage with an excess number of compartments is provided. The travel of the carriage translates the bays in one direction past the machine for the loading of one pallet line and in the other direction past the machine for the loading of the other line.

For a single pallet line, the carriage movement would be step-by-step to load the carriage bays, and rapid return to the starting position following unloading of the bays.

A small quantity of control elements such as limit switches are employed, these being located in the overhead area, generally out of the sand-filled environment.

BRIEF DESCRIPTION OF THE DRAWINGS

FIG. 3 is a plan view of the mechanism of FIG. 1, in greater detail; and

FIG. 4 is a front view in elevation of the mechanism as shown in FIG. 3.

DETAILED DESCRIPTION OF THE DRAWINGS

Figure 1:
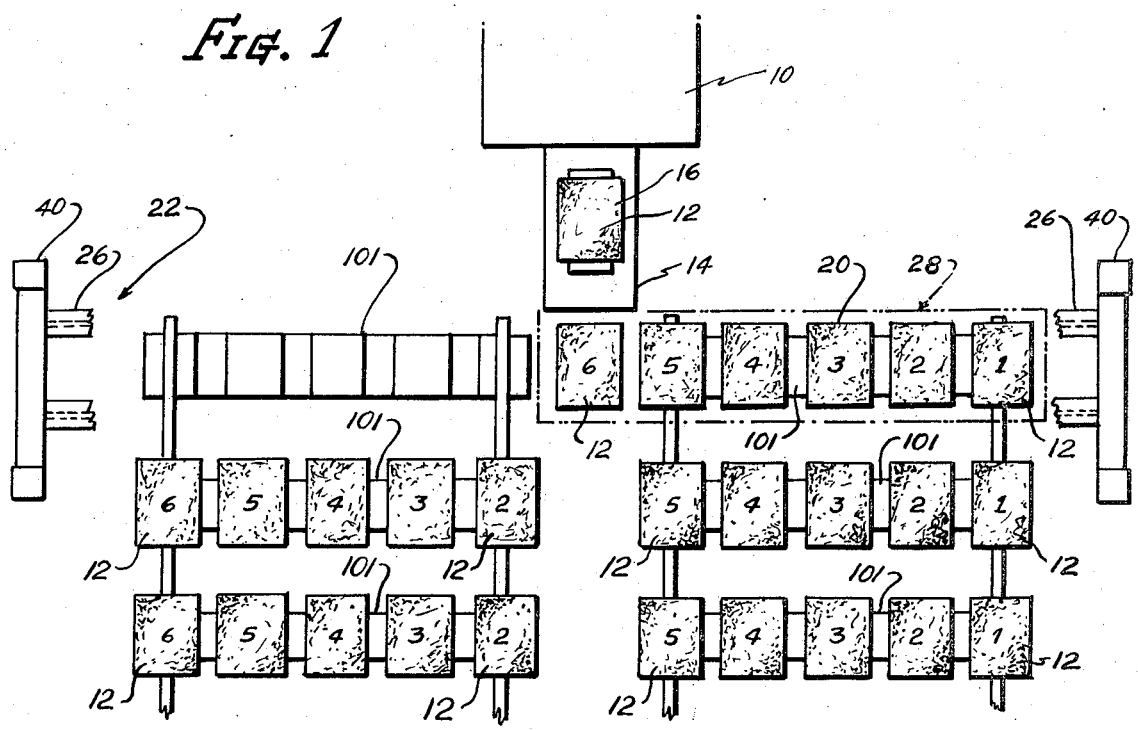
FIG. 1 is a partially schematic plan view of the transfer mechanism of the invention, with the track partially broken away to expose the area therebelow.

In FIG. 1, I show a molding machine 10 of any known type which delivers a mold 12 which may be a flask mold or flaskless mold onto an output or delivery station 14 for subsequent movement to my transfer mechanism. A typical machine to which my transfer mechanism may be applied is the Hunter HMP-10 machine, manufactured by the Hunter Automated Machinery Corp. of Schaumberg, Illinois. As delivered from the machine to the station, the mold rests on a perforated bottom board 16 which provides support for the mold. The board normally is slightly narrower in width than the width of the mold to be placed on the board. In its delivery from the machine, both the mold and bottom board are elevated or pushed onto the delivery station platform 14 in any known fashion. A mold as shown herein may be a flaskless mold in which two halves of a block of sand are mated, the block halves defining an internal mold cavity. Alternately, the mold may be housed within a suitable flask of wood or the like.

From the station platform, a mold is carried into a single-mold bay 20 of the transfer mechanism 22. The mechanism is then translated longitudinally to position an empty bay in alignment with the output station. In this way, the transfer mechanism 22, as shown herein, receives each mold delivered serially to the station and aligns the molds in a parallel alignment for delivery to a pallet line 24, shown in FIG. 1 as a double pallet line. The pallet line shown comprises at least two longitudinally spaced alignments of five molds each and the total line is capable of supporting a plurality of alignments.

The transfer mechanism shown in FIG. 1, comprises an overhead longitudinal track 26 laterally positioned intermediately between the output station 14 and the pallet line 24. Suspended from the track is a multiple bay carriage 28 capable of translatory step-by-step motion along the track under the control of a Geneva drive mechanism 30 mounted atop the track. On each step of the mechanism, a mold receiving bay is placed in lateral alignment with the machine output station.

A preferred movement pattern for the transfer mechanism 22, as used for a double pallet line, can be followed from the starting position shown in FIG. 1. There, I show bay no. 6 aligned adjacent the delivery station. A mold is delivered to bay no. 6 and the mechanism indexes to place bay no. 5 adjacent the station. A mold is placed in bay no. 5 and the station is indexed. Subsequent bay nos. 4, 3 and 2 are loaded in the same fashion to place bay no. 6 in alignment with pallet position 6 as seen in FIG. 1. In this position, all bays may be unloaded to the left pallet line by moving the mold boards onto lateral conveyors or truck runs of the pallet line.

In this unloading position, bay no. 1 is adjacent the delivery station for subsequent loading of bay nos. 1-5 in sequence in a step-by-step return movement of the carriage. When bay nos. 1-5 have been loaded and the carriage has indexed to place bay nos. 6 adjacent the station, bay nos. 1-5 may be unloaded and the carriage has returned to its starting position as shown in FIG. 1, for servicing the pallet line at the right in FIG. 1.

In FIG. 3, I show the transfer mechanism 22 itself. The mechanism includes an overhead track 26 mounted on suitable vertical uprights 40 which support and elevate the track at the proper height. The track 26 comprises twin spaced apart I beams 42 mounted on the vertical uprights with suitable support members to produce structural rigidity. Suspended from the track beams 42 is the five bay carriage 28. The carriage is suspended at all four corners by vertical trolley supports 50, the supports having at their upper ends rollers 52 which ride within the bottom flange of the I beam.

Figure 2:
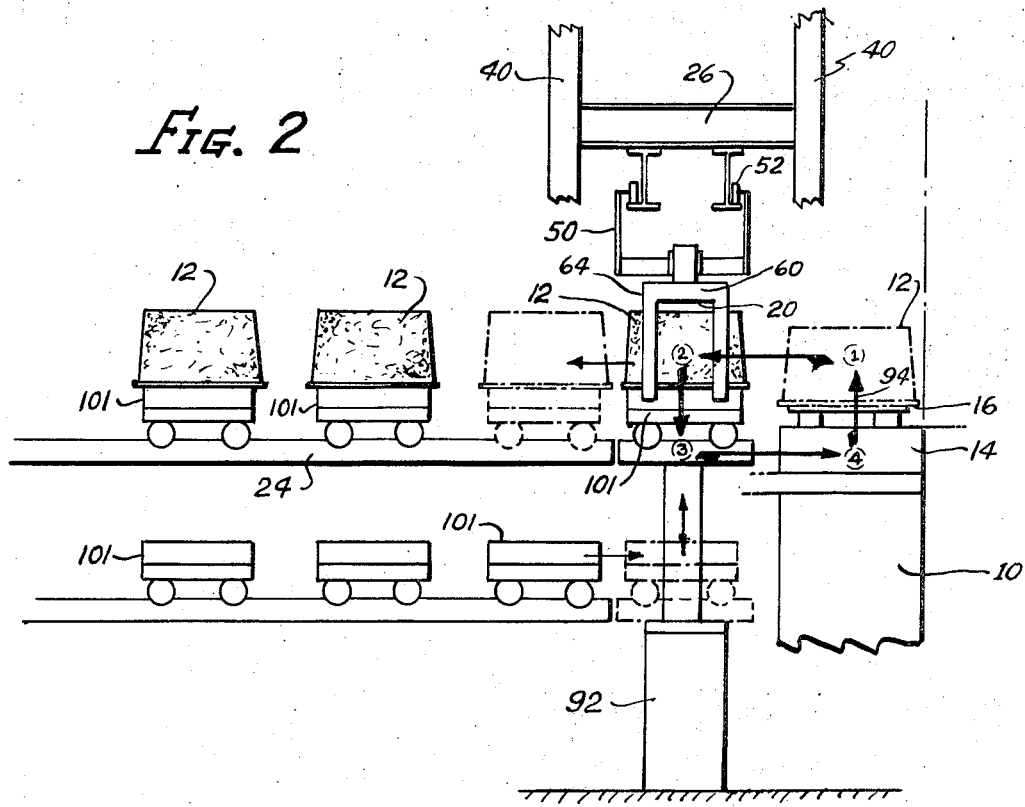
FIG. 2 is a sectional view taken along line 2—2 of FIG. 1.

The carriage itself is a rigid structural assembly comprised of two laterally spaced top support beams 60 connected transversely at the extreme longitudinal ends. The length of the carriage is divided into six bays 20 of equal size, the bays being seen best in FIG. 4. Each bay is comprised of four vertical corner post beams 64 welded or otherwise rigidly affixed to the carriage top support beams 60. Each bay has angle brackets 66 secured to the bottom of the corner post beams 64 to produce a laterally extending horizontal flange along the front and back of eacy bay. Each such flange may extend about 2 inches into a bay leaving a central open bottom approximately 12 inches in length. Each bay is of sufficient height (12 inches in height) to readily receive any mold capable of being produced in the machine, and the corner posts are spaced longitudinally to receive the mold therebetween. The transverse spacing of the corner posts produces a space about 20 inches in lateral width to allow a slight overhang of the mold bottom board at each side as can be seen in FIG. 2.

As mentioned, the carriage is mounted on overhead rollers 52, the rollers being confined to longitudinal rolling movement along the flanges of the track beams 42. To move the carriage in the longitudinal path, there is provided a wire rope drive. A wire rope 70 is suitably connected to the carriage at one end 72 and extends up to the top of the carriage at one end of the track at which the rope is passed over an idler pulley 74. The rope passes over the pulley and extends substantially the full length of track 26 to a driven pulley 76. The rope is wound about or connected to the driven pulley and passes thereunder for connection to the other end 78 of the carriage. Thus, on movement of the driven pulley in the clockwise direction (in FIG. 4), the carriage is translated to the left and conversely on counterclockwise rotation of the driven pulley 76.

Pulley 76 is rotated by a commercially available Geneva drive mechanism 30. An electric drive motor 80 operates the Geneva drive to rotate a lobed cam a predetermined angular distance on each operation of the motor, as is well-known in the art. Thus, on each motor operation, pulley 76 is rotated through a fraction of a revolution to move the drive rope a predetermined distance (equal to the center to center bay dimension, which may be 18 inches) and step the carriage one bay on each such operation. The movement of the carriage is smooth and is effected with controlled acceleration and smooth starting and stopping of movement due to this form of drive and construction.

The Geneva drive mechanism has a dwell position between lobes, in which the motion is stopped and started for each index operation by means of a limit switch mounted onto the Geneva drive. This limit switch (not shown) is located in the drive mechanism above track 26 and above the space in which loose sand is normally present. This stop period, so created, allows a period during which a mold can be placed in a bay prior to the carriage indexing.

In FIG. 2, I show a mold 12 resting on the delivery station 14. As mentioned, the mold rests on a bottom board 16 of rigid perforated aluminum, wood or other suitable rigid material. The station has a delivery mechanism 92 which elevates the bottom board a distance indicated by arrow 94 of FIG. 2, which may be in the range of 1½ inches. The delivery mechanism then advances transversely to position the bottom board slightly above the bay flanges 66. The delivery mechanism is then lowered allowing the bottom board to rest on the flanges, following which the delivery mechanism retracts to the position of FIG. 2 to complete its rectangular travel path. The delivery mechanism is narrower than the spacing between opposed flanges in a bay. Thus, once a mold has been lowered into position on a bay, the delivery mechanism continues to lower and retract fully out of the bay without disturbing the molds within the bays.

In a double pallet line system, when five bays are loaded and the carriage is in either the position of FIG. 1 or at the other extreme position, a signal is generated, either manually by operation of a button or automatically by suitable controls. In response to that signal, a suitable pallet conveyor is activated. While many pallet line constructions are possible, one form is shown in which the conveyor has individual wheeled trucks aligned in rows, with one row for each carriage bay. One alignment of five trucks is aligned under the carriage and is elevated to raise the five molds in the carriage bays simultaneously. The elevator then advances the five trucks from the transfer mechanism to the pallet line platform. The platform may have a lateral conveyor of any suitable form, so that the truck alignment may be advanced laterally onto the pallet line to become the end section of the line. On the next load being delivered to the pallet line the first alignment of trucks (or end section) is moved to make way for the later alignment removed from the carriage. These pallet trucks are, of course, narrower than the spacing between flanges in a bay so that the pallet trucks may be elevated to raise all molds in the carriage. As mentioned previously, the end of each carriage bay is open to allow the trucks to be moved laterally without interference with the carriage structure.

In the embodiment shown schematically in FIG. 4, the pallet delivery system comprises the described series of transversely movable wheeled trucks 105 movable in a generally rectangular path. There is one path for each bay and like position on the pallet line. As mentioned, the trucks are elevated under the carriage bays and the trucks are advanced from the carriage onto the pallet line to suitably advance the last alignment across the top of the path away from the transfer mechanism.

If the transfer mechanism is to service only one pallet line, for example line A of FIG. 1, the line having six positions, an identical transfer mechanism structure is used. Only the operating procedure need be changed slightly. In this procedure, the bays are filled in a sequence from the extreme position of FIG. 1 to load bay Nos. 6, 5, 4, 3, 2 and 1, in that sequence, at which time the carriage is adjacent the A line. The six molds are then delivered to pallet line A by the trucks and the carriage is retracted in a rapid return empty trip back to the starting position of FIG. 1.

With the mechanism shown, the movement of the carriage may be controlled by a single limit switch in the output platform elevator. In this way, the carriage motor is energized on the elevator descending after leaving a mold in a bay. The motor drives the carriage a distance of one bay, the drive movement being a smooth one of uniform acceleration and deceleration, free of any jolting movement. The Geneva mechanism is set to stop the motor after rotation in an angular distance of one cam lobe. The cycling of the elevator is interlocked with the carriage drive motor limit switch to allow the elevator to start its cycle only when the drive mechanism is at rest during the dwell period of the Geneva mechanism.

The transfer mechanism, as described, feeds either a single or a double pallet line from the machine output in a trouble-free, easily serviced manner.

I claim:

1. A transfer mechanism for use in a sand filled environment for transporting molds comprising joined sections of compressed molding material from the output of an automatic molding machine and for transferring the molds alternately to two longitudinally spaced pallet lines on both longitudinal sides of said machine output, the lines being laterally spaced from the output of said machine, said mechanism comprising: a carriage comprised of a plurality of mold receiving bays aligned longitudinally, each bay comprising structure for receiving a mold from one side holding mold therein, and permitting removal of said mold from the other side thereof, said carriage reciprocal from one extreme position with one end bay laterally spaced adjacent said output station to the opposite extreme position with the position end bay laterally spaced from said station, means for stepping said carriage in steps between extreme positions, said stepping means comprising an overhead transport control including enclosed Geneva drive mechanism engendering a move of one bay length on each step thereof with a dwell between each such step to allow loading of a mold onto the bay laterally adjacent the output station unloading the mechanism with one extreme end bay laterally adjacent the station, and means operative for reversing the direction of said stepping movement after the unloading of molds from said mechanism.

2. A transfer mechanism as claimed in claim 1, wherein each bay comprises
   vertical corner supporting posts spaced from a mold borne therein, and
   flanged members connecting laterally adjacent supporting posts to align horizontal flanges at the longitudinal ends of said bay for receiving and supporting a mold bottom board adjacent its edges.

3. A transfer mechanism for transporting flaskless sand molds from the serial output of a molding machine to a foundry pallet line disposed perpendicular to the output path of a mold from said molding machine, said mechanism comprising a multiple bay carriage mechanism with said bays aligned parallel to said pallet line and reciprocal along a path normal to said output path, each said bay comprising a generally open-bottomed, skeletal structure, support members along the margins of a bay for holding a mold therein, means for driving said mechanism along said normal path in step-by-step manner, said driving means comprising an overhead Geneva mechanism for driving said carriage in step-by-step fashion to stop said mechanism with a bay adjacent said machine output after each step, and each said bay having transversely open sides to allow transverse entry and removal of molds on either side thereof.

4. A transfer mechanism for interfacing between the output station of a sand molding machine and a repository molding platform in a generally sand-filled environment, comprising a conveyor apparatus reciprocable in a plurality of steps in a path normal to the output of said station, said conveyor apparatus comprising a plural compartment shuttle structure with said plural compartments aligned serially in said path, means for advancing said structure to position a compartment in alignment with said station on each step, each compartment comprising a pair of opposed bottom rail members for receiving a sand mold resting on a rigid bottom board, said bottom rail members spaced apart a distance sufficient to hold said board adjacent the sides thereof on receipt of the mold from the station side, each said compartment being open on both sides to allow ready lateral discharge of said board on the side of said mechanism opposite the station side onto said platform, with the platform on a level slightly below the level of said side rail members, and each compartment being laterally open to permit unencumbered movement of an alignment of said molds laterally out of the respective compartments.

5. A mechanism as claimed in claim 4, wherein the drive for said advancing means comprises a rope drive acted upon by a generally enclosed Geneva mechanism elevated above apparatus for advancing said apparatus in a sequence of smoothly accelerated and decelerated steps.

* * * * *